United States Patent
Scalora et al.

(10) Patent No.: US 8,037,115 B1
(45) Date of Patent: Oct. 11, 2011

(54) METHOD AND SYSTEM TO COMPENSATE FOR INACCURACY ASSOCIATED WITH PROCESSING VALUES WITH FINITE PRECISION

(75) Inventors: Michael Amore Scalora, Orem, UT (US); Walter Holladay, Lindon, UT (US); Yulin Dong, Provo, UT (US)

(73) Assignee: Intuit Inc., Mountain View, CA (US)

(\*) Notice: Subject to any disclaimer, the term of this patent is extended or adjusted under 35 U.S.C. 154(b) by 1294 days.

(21) Appl. No.: 11/624,153

(22) Filed: Jan. 17, 2007

(51) Int. Cl.
*G06F 7/00* (2006.01)

(52) U.S. Cl. ........ 708/204; 708/205; 708/206; 708/208; 708/209

(58) Field of Classification Search .......................... None
See application file for complete search history.

(56) References Cited

U.S. PATENT DOCUMENTS 5,923,316 A * 7/1999 Kitamura et al. ............. 345/603
7,659,911 B2 * 2/2010 Wittenstein ................... 345/591

\* cited by examiner

*Primary Examiner* — Lewis Bullock, Jr.
*Assistant Examiner* — Michael Yaary
(74) *Attorney, Agent, or Firm* — Gunnison, McKay & Hodgson, L.L.P.; Philip McKay (57) ABSTRACT

A method and system to compensate for inaccuracy associated with processing values with finite precision includes a process for selecting a display value whereby an initial value is provided in a first numbering system. The initial value is then converted into an equivalent stored value in a second numbering system. Then a display value in the first numbering system is determined and selected such that the selected display value includes the least number of significant digits that convert from the first numbering system to the second numbering system exactly as the stored value. The selected display value in the first numbering system is then used for display and/or further processing when the stored value in the second numbering system is recalled.

27 Claims, 3 Drawing Sheets

METHOD AND SYSTEM TO COMPENSATE FOR INACCURACY ASSOCIATED WITH PROCESSING VALUES WITH FINITE PRECISION

BACKGROUND

When using many computing systems and/or computing system implemented processes, a value is entered and/or edited and/or displayed in one numbering system such as a first system of units or number base, typically in an ASCII/text decimal form. Then the value is stored in a second numbering system, such as a second system of units or number base, typically in a binary format. The value is then later accessed and/or recalled for processing and/or display again in the first numbering system. This process of entering and/or editing a value in one numbering system, storing the value in a second numbering system, and then recalling the value in the first numbering system, is often referred to as "round-tripping".

During round-tripping, the conversion or "scaling" of the initial value between the two numbering systems often results in discrepancies that can appear to users as errors and/or as cumbersome numerical values with little or no physical relevance. This error introduced by round-tripping is referred to herein as one example of "rounding error".

Due to round-tripping and rounding error, it is often the case that when a value is entered and/or edited in one unit of measure, such as inches, and then stored in a second unit of measure, such as feet, and then again recalled and/or displayed in the first unit of measure, the recalled value eventually displayed or subjected to further processing, also called a display value, does not match the value initially entered and/or edited.

As a specific example, suppose a user enters and/or edits an initial value 0.25 inches into a computing system, typically in an ASCII/text decimal form, running a computing system implemented process, such as a computing system implemented point of sale application. For this example, assume the computing system implemented point of sale application stores all values in units of feet. Consequently, in this example, the initial value 0.25 inches is multiplied by the scaling ratio (1 foot/12 inches or 0.0833333) to obtain a stored value of 0.02083 feet, which is the correct conversion of the initial value 0.25 inches using four significant digits. The stored value of 0.02083 feet is typically stored in a binary format In this specific example, once the initial value of 0.25 inches is converted to the stored value of 0.02083 feet, it is further stipulated that the user calls up the value to be displayed again, or to be further processed as a display value in the unit of inches. In this case, the stored value 0.02083 feet is then multiplied by the scaling ratio (12 inches/1 foot or 12.000), which is the reciprocal of the original scaling ratio. However, this operation results in a recalled value of 0.24997 inches. Given that when the recalled value of 0.24997 inches is multiplied by the scaling ratio (1 foot/12 inches), the exact same stored value of 0.02083 feet results, it follows that the recalled value of 0.24997 inches is technically correct. However, as discussed above, the entered initial value of 0.25 inches also results in the stored value of 0.02083 feet and is a much more useful and aesthetically pleasing representation of the stored value and, in many cases more accurately reflects physical realities/capabilities.

The rounding error associated with round-tripping discussed above is not restricted to units of measure. The problem arises anytime a value is scaled using finite precision arithmetic, i.e., with limited precision. Consequently, the rounding error problem is equally prevalent anytime an initial value is entered and/or edited in one numbering system, converted to a stored value in a second numbering system, and then converted back to a recalled value in the first numbering system, such as: when two number bases are used, such as a decimal (base ten) system and a binary (base two) system; when a metric system and an American system are used; when different monetary systems are used; or when different sales, inventory and/or packaging units are used.

SUMMARY

In accordance with one embodiment, a method and system to compensate for inaccuracy associated with processing values with finite precision includes a process for selecting a display value whereby an initial value is provided in a first numbering system and typically in an ASCII/text decimal format. The initial value is then converted into an equivalent stored value in a second numbering system and typically in a binary format. Then a display value in the first numbering system, and typically in an ASCII/text decimal format, is selected such that the selected display value includes the least number of significant digits in the first numbering system that convert from the first numbering system to the second numbering system exactly as the stored value. The selected display value is then used for display and/or further processing when the stored value is recalled.

In one embodiment, the process for selecting a display value includes providing an initial value in a first numbering system and then converting the initial value in the first numbering system to a stored value in a second, different, numbering system. The stored value is then saved.

The stored value in the second numbering system is then recalled and converted back to the first numbering system as a recalled value in the first numbering system. Then, in one embodiment, the last, or least, significant digit of the recalled value in the first numbering system is eliminated to create an edited recalled value in the first numbering system. The edited recalled value in the first numbering system is then stored and a copy is converted into the second numbering system as an edited recalled value in the second numbering system. The edited recalled value in the second numbering system is then compared to the stored value in the second numbering system.

If it is found that the edited recalled value in the second numbering system is equal to the stored value in the second numbering system, then it is concluded that the least significant digit was irrelevant and it was appropriate to eliminate it. In this instance, in one embodiment, the next last, or least, significant digit of the recalled value in the first numbering system, i.e., the last significant digit of the edited recalled value in the first numbering system, is then eliminated to create a new edited recalled value in the first numbering system. The new edited recalled value in the first numbering system is then stored and a copy is converted into the second numbering system as a new edited recalled value in the second numbering system. The new edited recalled value in the second numbering system is then compared to the stored value in the second numbering system.

The above process is repeated until the edited recalled value in the second numbering system is compared to the stored value in the second numbering system and it is determined that the edited recalled value in the second numbering system is not equal to the stored value in the second numbering system. In this instance, it is concluded the too many significant digits have been eliminated from the recalled value and that the present edited recalled value is not appropriate for use as the displayed value. As a result, the edited recalled value in the first numbering system corresponding to the last edited recalled value in the second numbering system that was equal to the stored value is selected and designated the display value. The selected display value is then used for further display and/or processing.

Using the method and system to compensate for inaccuracy associated with processing values with finite precision, and a process for selecting a display value, as disclosed herein, the display value in the first numbering system selected is the value in the first numbering system that has the least number of significant digits that still converts to the same stored value in the second numbering system. Consequently, using the method and system to compensate for inaccuracy associated with processing values with finite precision, and a process for selecting a display value, as disclosed herein, rounding error associated with round-tripping in computing systems using finite arithmetic is minimized because the stored value remains unchanged, while the resulting display value is made as useful, practical and aesthetically pleasing, as possible.

As discussed in more detail below, using the below embodiments, with little or no modification and/or user input, there is considerable flexibility, adaptability, and opportunity for customization to meet the specific needs of various users under numerous circumstances.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system to compensate for inaccuracy associated with processing values with finite precision includes a process for selecting a display value whereby an initial value is provided in a first numbering system. The initial value is then converted into an equivalent stored value in a second numbering system. Then a display value in the first numbering system is selected such that the selected display value includes the least number of significant digits in the first numbering system that convert from the first numbering system to the second numbering system exactly as the stored value. The selected display value is then used for display and/or further processing when the stored value is recalled.

In one embodiment, the process for selecting a display value includes providing an initial value in a first numbering system and then converting the initial value in the first numbering system to a stored value in a second, different, numbering system. The stored value is then saved.

The stored value in the second numbering system is then recalled and converted back to the first numbering system as a recalled value in the first numbering system. Then, in one embodiment, the last, or least, significant digit of the recalled value in the first numbering system is eliminated to create an edited recalled value in the first numbering system. The edited recalled value in the first numbering system is then stored and a copy is converted into the second numbering system as an edited recalled value in the second numbering system. The edited recalled value in the second numbering system is then compared to the stored value in the second numbering system.

If it is found that the edited recalled value in the second numbering system is equal to the stored value in the second numbering system, then it is concluded that the least significant digit was irrelevant and it was appropriate to eliminate it. In this instance, in one embodiment, the next last, or least, significant digit of the recalled value in the first numbering system, i.e., the last significant digit of the edited recalled value in the first numbering system, is then eliminated to create a new edited recalled value in the first numbering system. The new edited recalled value in the first numbering system is then stored and a copy is converted into the second numbering system as a new edited recalled value in the second numbering system. The new edited recalled value in the second numbering system is then compared to the stored value in the second numbering system.

The above process is repeated until the edited recalled value in the second numbering system is compared to the stored value in the second numbering system and it is determined that the edited recalled value in the second numbering system is not equal to the stored value in the second numbering system. In this instance, it is concluded the too many significant digits have been eliminated from the recalled value and that the present edited recalled value is not appropriate for use as the displayed value. As a result, the edited recalled value in the first numbering system corresponding to the last edited recalled value in the second numbering system that was equal to the stored value is selected and designated the display value. The selected display value is then used for further display and/or processing.

Using the method and system to compensate for inaccuracy associated with processing values with finite precision, and a process for selecting a display value, as disclosed herein, the display value in the first numbering system selected is the value in the first numbering system that has the least number of significant digits that still converts to the same stored value in the second numbering system. Consequently, using the method and system to compensate for inaccuracy associated with processing values with finite precision, and a process for selecting a display value, as disclosed herein, rounding error associated with round-tripping in computing systems using finite arithmetic is minimized because the stored value remains unchanged, while the resulting display value is made as useful, practical and aesthetically pleasing, as possible.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filing or as developed later. Some embodiments are implemented in a mobile computing system running mobile operating systems such as Symbiane® OS, Windows® Mobile, or any other operating system designed to generally manage operations on a mobile computing system, whether known at the time of filing or as developed later. As described more fully below, embodiments can be implemented on computing systems other than a conventional computing system such as, for example, a personal digital assistant, a cell phone, or other computing system capable of processing computer readable data, whether known at the time of filing or as developed later. Computing systems also include those in which one or more computing resources (hardware or software) are located remotely and accessed via network, such as a Local Area Network (LAN), Wide Area Network (WAN), a public network, such as the Internet, a private network, a combination of network types, a computing system bus, or other electronic medium in which data may be exchanged between one computing system and one or more other computing system(s), whether known at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, processes and/or systems described herein may make use of input provided to the computer device implementing a process and/or application, discussed herein, via user interface devices such as a keyboard, mouse, touchpad, or any other device capable of providing user input to a computing system or for translating user actions into computing system operations, whether known at the time of filing or as developed later.

Hardware System Architecture

Figure 1:
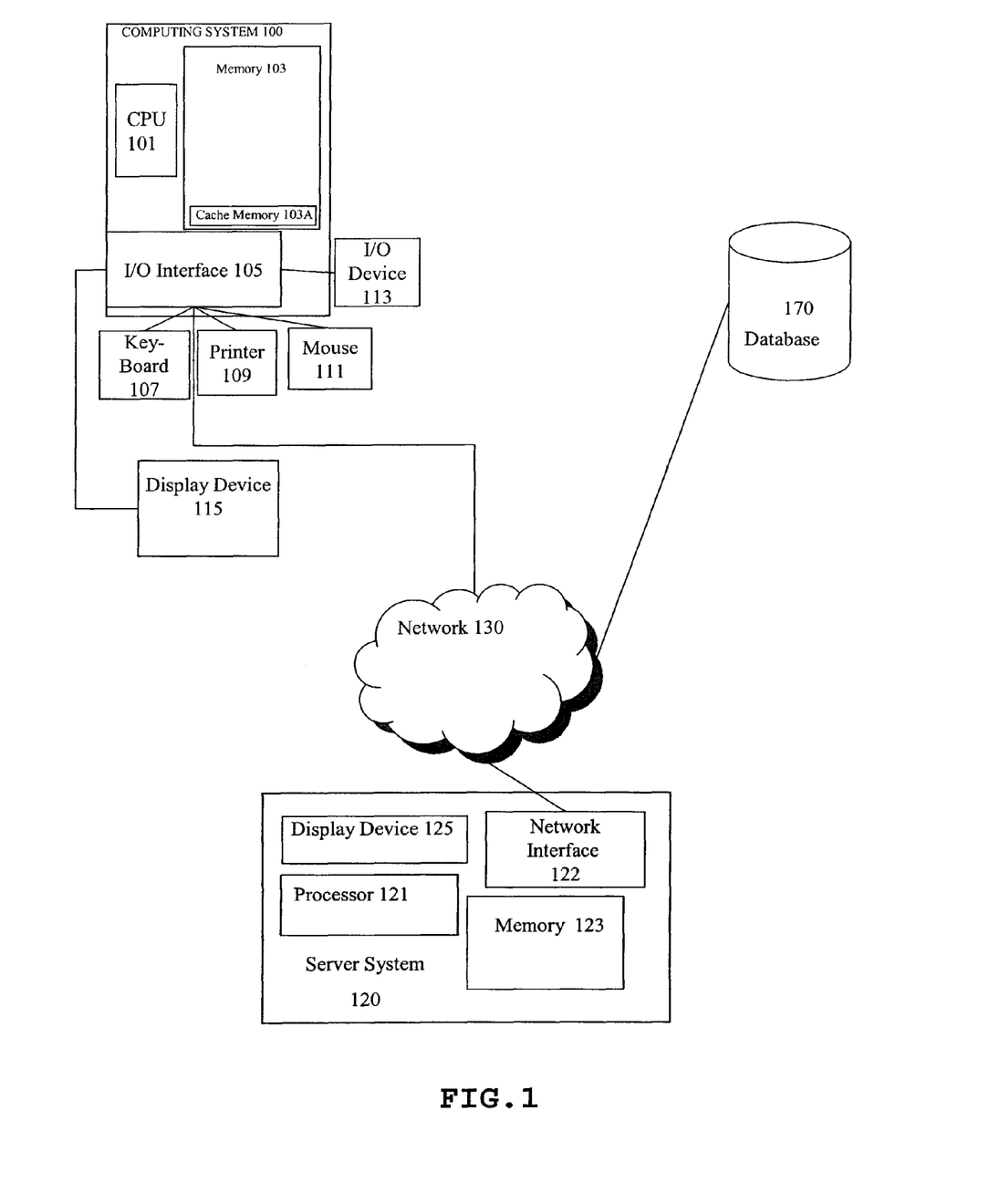
FIG. 1 is a block diagram of an exemplary hardware architecture for implementing one embodiment.

FIG. 1 is a block diagram of exemplary hardware architecture for implementing one embodiment of a process for selecting a display value, such as process for selecting a display value 200 discussed below, that includes: a computing system 100; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes all or part of a process for selecting a display value.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether known at the time of filing or as later developed. As discussed in more detail below, in one embodiment, a process for selecting a display value can be loaded, in whole, or in part, into computing system 100 via I/O device 113, such as from a CD, DVD or floppy disk containing all, or part, of a process for selecting a display value.

Also shown in FIG. 1 is database 170. In one embodiment, database 170 is a designated server system or computing system, or a designated potion of a server system or computing system, such as computing systems 100 and 120. In one embodiment, database 170 is a dedicated mass storage device implemented in software, hardware, or a combination of hardware and software. In one embodiment, database 170 is a web-based function. As discussed in more detail below, in one embodiment, a process for selecting a display value is stored in whole, or in part, in database 170.

In one embodiment, computing system 100 and database 170, are coupled to a server system 120 by network 130. Server system 120 typically includes a server system display device 125, a server system processor 121, a server system memory 123, and a server system network interface 122. As discussed in more detail below, in one embodiment, a process for selecting a display value is stored in whole, or in part, in server system 120.

Network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether known at the time of filing or as later developed. In various embodiments, server system network interface 122 and I/O interface 105 include analog modems, digital modems, a network interface card, a broadband connection, or any other means for communicably coupling computing system 100, database 170, and server system 120, via network 130, whether known at the time of filing or as later developed.

Those of skill in the art will readily recognize that the components shown in FIG. 1, such as computing system 100, database 170, server system 120, and their respective components, are shown for illustrative purposes only and that architectures with more or fewer components can implement, and benefit from, a process for selecting a display value, such as process for selecting a display value 200, discussed below. Moreover, one or more components of computing system 100, database 170, and server system 120 may be located remotely from their respective system and accessed via network, as discussed herein. In addition, the particular type of, and configuration of, computing systems 100, database 170, and server system 120 are not relevant.

As discussed in more detail below, in one embodiment, a process for selecting a display value is stored in whole, or in part, in memory system 103 and/or cache memory 103A, of computing system 100, and/or in server memory system 123 of server system 120 and/or in database 170, and executed on computing system 100. As used herein, a memory refers to a volatile memory, a non-volatile memory, or any combination of the two.

Although a process for selecting a display value can sometimes be referred to herein, alternatively, as a process, an application, a module, a program, a component of a software system, a component of a software package, a component of a parent system, or a feature of a parent system, this terminology is illustrative only. In some embodiments, a process for selecting a display value is capable of being called from an application or the operating system. In one embodiment, an application or program is generally defined to be any executable code. Moreover, those of skill in the art will understand that when it is said that an application or an operation takes some action, the action is the result of executing one or more instructions by a processor, such as processor 101 or server system processor 121. In one embodiment, execution of a process for selecting a display value by processor 101 or server system processor 121, results in the operations of an agent computer process (not shown) and/or a rule computer process (not shown).

In one embodiment, a process for selecting a display value is a computer application or process implemented and/or run and/or stored, in full, or in part, in, or on, a computer program product. Herein, a computer program product comprises a medium configured to store and/or transport computer readable code, whether known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code, whether known at the time of filing or as later developed. This medium may belong to a computing system, such as computing system 100 of FIG. 1, described above. However, the medium also may be removed from the computing system.

For example, all, or part, of a process for selecting a display value may be stored in a memory that is physically located in a location, such as server system memory 123, or database 170, of FIG. 1, different from a computing system, such as computing system 100 of FIG. 1, utilizing a process for selecting a display value. In one embodiment, all, or part, of a process for selecting a display value may be stored in a memory that is physically located, separate from the computing system's processor(s), such as processor 101 of FIG. 1, and the computing system processor(s) can be coupled to the memory in a client-server system, such as server system 120 of FIG. 1, or, alternatively, via connection to another computer, such as computing system 100 of FIG. 1, via modems and analog lines, digital interfaces and a digital carrier line, or wireless or cellular connections.

In one embodiment, the computing systems and/or server system, such as computing system 100 and/or server system 120 of FIG. 1, running and/or utilizing and/or storing all, or part, of a process for selecting a display value is a portable computer, a workstation, a two-way pager, a cellular telephone, a smart phone, a digital wireless telephone, a personal digital assistant, a server computer, an Internet appliance, or any other device that includes components that can execute all, or part, of a process for selecting a display value in accordance with at least one of the embodiments as described herein. Similarly, in another embodiment, a process for selecting a display value is implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

A method and system to compensate for inaccuracy associated with processing values with finite precision includes a process for selecting a display value whereby an initial value is provided in a first numbering system. The initial value is then converted into an equivalent stored value in a second numbering system. Then a display value in the first numbering system is determined and selected such that the selected display value includes the least number of significant digits that convert from the first numbering system to the second numbering system as the stored value. The selected display value in the first numbering system is then used for display and/or further processing when the stored value in the second numbering system is recalled.

Figure 2A:
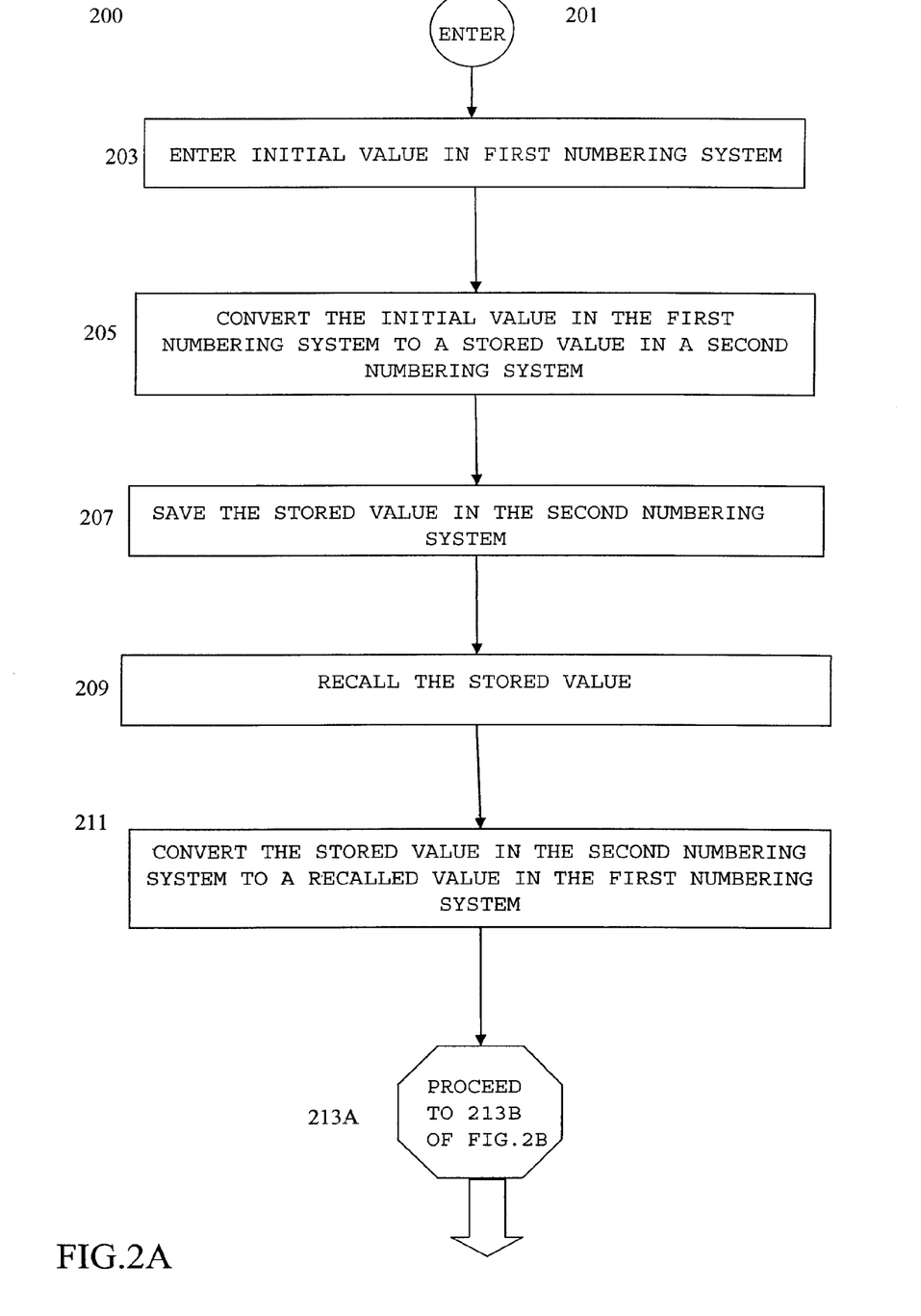
FIGS. 2A and 2B together are a flow chart depicting a process for selecting a display value in accordance with one embodiment.
Figure 2B:
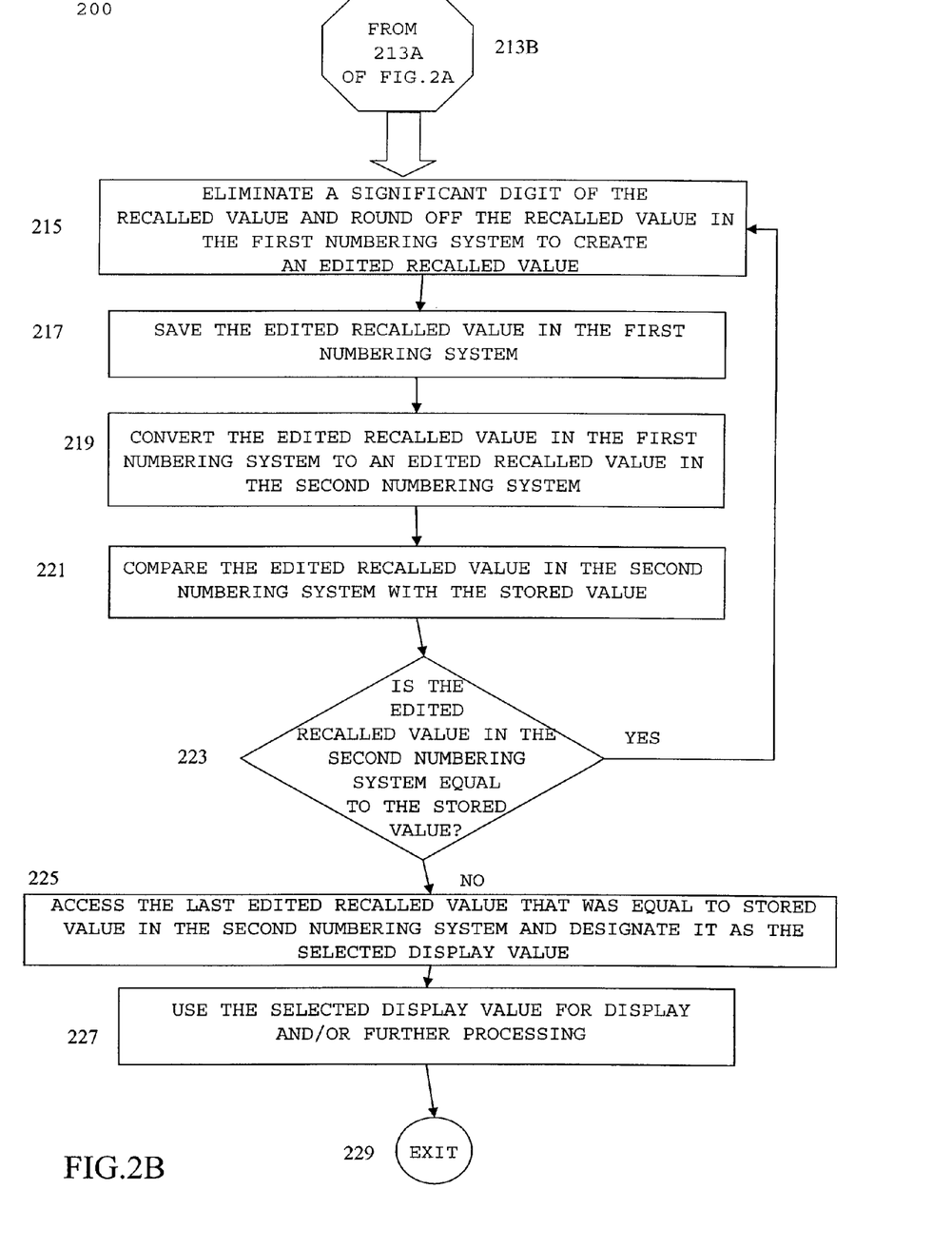

FIGS. 2A and 2B together are a flow chart depicting a process for selecting a display value 200 in accordance with one embodiment. Process for selecting a display value 200 begins at ENTER OPERATION 201 of FIG. 2A and process flow proceeds to ENTER INITIAL VALUE IN FIRST NUMBERING SYSTEM OPERATION 203.

In one embodiment, at ENTER INITIAL VALUE IN FIRST NUMBERING SYSTEM OPERATION 203 an initial value is entered into a computing system and/or computing system implemented process, such as a computing system implemented financial management system, in a first numbering system.

As noted above, the initial value is entered in a first numbering system. The first numbering system can be various types of numbering systems including, but not limited to: systems of units of measure, such as physical units of length, area, volume and weight, i.e., inches, feet, yards, miles, square inches, square feet, square yards, square miles, cubed inches, cubed feet, cubed yards, grams, ounces, pounds, tons, millimeter, centimeters, meters, square millimeters, square centimeters, square meters, square kilometers, cubed millimeters, cubed centimeters, cubed meters, kilograms, metric tons, etc.; any other unit based numbering system; and/or base numbering systems, such as base two (binary), base ten (decimal), or base sixteen (hexadecimal); monetary units such as dollars, cents, pounds, francs, yen etc.; sales, packaging, accounting and/or inventory units, such a dozens, gross, etc.; or any other numbering system desired by the using whether known at the time of filing or as later developed/adopted.

As noted above, in one embodiment, the initial value is entered into and/or through a computing system and/or computing system implemented process, such as a computing system implemented financial management system, at ENTER INITIAL VALUE IN FIRST NUMBERING SYSTEM OPERATION 203. Currently, several computing system implemented financial management systems are available including, but not limited to: computing system implemented inventory tracking systems; computing system implemented point of sale systems; computing system implemented personal financial management systems; computing system implemented small business financial management systems; computing system implemented general business financial management systems; computing system implemented tax preparation systems; computing system implemented accounting and/or invoicing systems; and various other electronic transaction driven data management systems, packages, programs, modules, or applications.

In one embodiment, at ENTER INITIAL VALUE IN FIRST NUMBERING SYSTEM OPERATION 203 a user interface is created, provided, and displayed by the computing system and/or computing system implemented process on a display device, such as display devices 115 and 125 of a computing system and/or device, such as computing system 100 and/or server system 120 of FIG. 1 by any one of numerous methods, mechanisms, processes and/or procedures well known to those of skill in the art or as developed after the time of filing.

As discussed above, the computing system and/or device, such as computing system 100 and/or server system 120 of FIG. 1, implementing the process for selecting a display value and providing for the entering of an initial value in a first numbering system at ENTER INITIAL VALUE IN FIRST NUMBERING SYSTEM OPERATION 203 and/or displaying and/or processing all, or part, of a process for selecting a display value 200 of FIGS. 2A and 2B, is a portable computer, a workstation, a two-way pager, a cellular telephone, a smart phone, a digital wireless telephone, a personal digital assistant, a server computer, an Internet appliance, or any other device that includes components that can provide a process for selecting a display value user interface and/or a process for selecting a display value in accordance with at least one of the embodiments as described herein. Similarly, in another embodiment, a process for selecting a display value is implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

In one embodiment, data representing the initial value in the first numbering system is entered into process for selecting a display value 200 through any standard user interface devices including but not limited to: a keyboard, such as a keyboard 107 of FIG. 1; a mouse, such as mouse 111 of FIG. 1; a stylus; or other device capable of inputting data to, and outputting data from, a computing system such as computing system 100 or sever system 120, in response to any action or command of a user, whether known at the time of filing or a developed thereafter.

Returning to FIG. 2A, in one embodiment, once an initial value is entered into a computing system and/or computing system implemented process at ENTER INITIAL VALUE IN FIRST NUMBERING SYSTEM OPERATION 203, process flow proceeds to CONVERT THE INITIAL VALUE IN THE FIRST NUMBERING SYSTEM TO A STORED VALUE IN A SECOND NUMBERING SYSTEM OPERATION 205.

In one embodiment, at CONVERT THE INITIAL VALUE IN THE FIRST NUMBERING SYSTEM TO A STORED VALUE IN A SECOND NUMBERING SYSTEM OPERATION 205 the initial value entered at ENTER INITIAL VALUE IN FIRST NUMBERING SYSTEM OPERATION 203 is converted to a second numbering system to yield a stored value in the second numbering system.

In one embodiment, the initial value is converted to the stored value using a scaling ratio, also called a scaling factor, that when applied to, typically multiplied by, the initial value in the first numbering system yields an equivalent stored value in the second numbering system. Typically, a scaling factor is a number equivalent to a fraction where the numerator value in the second numbering system is divided by an equivalent denominator value in the first numbering system (second numbering system/first numbering system). As a specific example, the scaling factor to convert inches to feet would be 0.083333 that is equivalent to 1 foot/12 inches.

In one embodiment, the conversion of the initial value in the first numbering system is performed by a central processing unit, such as CPU 101 or processor 121 of FIG. 1 under the direction of a computing system such as computing system 100 and/or a computing system implemented process. In some embodiments, the conversion is performed by and/or under the direction of a computing system and/or computing system implemented process implementing all or part of process for selecting a display value 200 of FIGS. 2A and 2B. In some embodiments the conversion is performed by and/or under the direction of a computing system and/or computing system implemented process separate from the computing system and/or computing system implemented process implementing all or part of process for selecting a display value 200.

Numerous methods, means, mechanisms, processes and procedures for converting a value from a first numbering system to a second, different, numbering system are well known to those of skill in the art. Consequently, a more detailed discussion of specific methods, means, mechanisms, processes and procedures for converting a value from a first numbering system to a second, different, numbering system at CONVERT THE INITIAL VALUE IN THE FIRST NUMBERING SYSTEM TO A STORED VALUE IN A SECOND NUMBERING SYSTEM OPERATION 205 are omitted here to avoid detracting from the invention.

As noted above, the second numbering system is a numbering system different from the first numbering system, otherwise a conversion would not be required. As with the first numbering system discussed above, the second numbering system of CONVERT THE INITIAL VALUE IN THE FIRST NUMBERING SYSTEM TO A STORED VALUE IN A SECOND NUMBERING SYSTEM OPERATION 205 can be any one of the various types of numbering systems discussed above including, but not limited to: systems of units of measure, such as physical units of length, area, volume and weight, i.e., inches, feet, yards, miles, square inches, square feet, square yards, square miles, cubed inches, cubed feet, cubed yards, grams, ounces, pounds, tons, millimeter, centimeters, meters, square millimeters, square centimeters, square meters, square kilometers, cubed millimeters, cubed centimeters, cubed meters, kilograms, metric tons, etc., either the same as those used above at ENTER INITIAL VALUE IN FIRST NUMBERING SYSTEM OPERATION 203 or in a different system of units of measure; any other unit based numbering system; and/or base numbering systems, such as base two (binary), base ten (decimal), or base sixteen (hexadecimal); monetary units such as dollars, cents, pounds, francs, yen etc.; sales, packaging, accounting and/or inventory units, such a dozens, gross, etc.; or any other numbering system desired by the using whether known at the time of filing or as later developed/adopted.

In addition, in one embodiment, the conversion at CONVERT THE INITIAL VALUE IN THE FIRST NUMBERING SYSTEM TO A STORED VALUE IN A SECOND NUMBERING SYSTEM OPERATION 205 can be from one family of units, such as volume or number of rolls of material to another family such as weight or length of material.

In one embodiment, once the initial value entered at ENTER INITIAL VALUE IN FIRST NUMBERING SYSTEM OPERATION 203 is converted to a second numbering system to yield a stored value in the second numbering system at CONVERT THE INITIAL VALUE IN THE FIRST NUMBERING SYSTEM TO A STORED VALUE IN A SECOND NUMBERING SYSTEM OPERATION 205, process flow proceeds to SAVE THE STORED VALUE IN THE SECOND NUMBERING SYSTEM OPERATION 207.

In one embodiment, at SAVE THE STORED VALUE IN THE SECOND NUMBERING SYSTEM OPERATION 207 data representing the stored value of CONVERT THE INITIAL VALUE IN THE FIRST NUMBERING SYSTEM TO A STORED VALUE IN A SECOND NUMBERING SYSTEM OPERATION 205 is stored and/or saved by storing/saving the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in a computer readable medium, and/or any other computer program product, as defined herein. In one embodiment, the data, in whole, or in part, is stored on a website or in a web-based system.

Returning to FIG. 2A, in some embodiments, the means for storing the data described above are maintained, in whole, or in part, by: the user, or a user computing system; a third party data storage institution; a provider of process for selecting a display value 200; a provider of a computing system implemented process implementing all, or part of, process for selecting a display value 200; any third party service or institution; or any other parties.

In one embodiment, once the data representing the stored value is stored and/or saved at SAVE THE STORED VALUE IN THE SECOND NUMBERING SYSTEM OPERATION 207, process flow proceeds to RECALL THE STORED VALUE OPERATION 209.

In one embodiment, at RECALL THE STORED VALUE OPERATION 209, the stored value of SAVE THE STORED VALUE IN THE SECOND NUMBERING SYSTEM OPERATION 207 is accessed and recalled for display and/or further processing in the first numbering system.

In one embodiment, at RECALL THE STORED VALUE OPERATION 209, the stored value of SAVE THE STORED VALUE IN THE SECOND NUMBERING SYSTEM OPERATION 207 is accessed and recalled for display and/or further processing in the first numbering system by the computing system and/or computing system implemented process implementing process for selecting a display value 200 and/or by the user through a user interface, such as discussed above.

In one embodiment, at RECALL THE STORED VALUE OPERATION 209, the stored value of SAVE THE STORED VALUE IN THE SECOND NUMBERING SYSTEM OPERATION 207, in the second numbering system, is accessed and recalled for display and/or further processing from a storage device, such as a memory and/or database and/or program product, including the storage devices discussed above with respect to SAVE THE STORED VALUE IN THE SECOND NUMBERING SYSTEM OPERATION 207.

In one embodiment, once the stored value of SAVE THE STORED VALUE IN THE SECOND NUMBERING SYSTEM OPERATION 207, in the second numbering system, is accessed and recalled for display and/or further processing at RECALL THE STORED VALUE OPERATION 209, process flow proceeds to CONVERT THE STORED VALUE IN THE SECOND NUMBERING SYSTEM TO A RECALLED VALUE IN THE FIRST NUMBERING SYSTEM OPERATION 211.

In one embodiment, at CONVERT THE STORED VALUE IN THE SECOND NUMBERING SYSTEM TO A RECALLED VALUE IN THE FIRST NUMBERING SYSTEM OPERATION 211 the stored value in the second numbering system of RECALL THE STORED VALUE OPERATION 209, is converted back to first numbering system to yield a recalled value in the first numbering system.

In one embodiment, the stored value is converted to the recalled value using a scaling factor that is the reciprocal of the scaling factor of CONVERT THE STORED VALUE IN THE FIRST NUMBERING SYSTEM TO A RECALLED VALUE IN A SECOND NUMBERING SYSTEM OPERATION 205, and that when applied to the stored value in the second numbering system yields an equivalent recalled value in the first numbering system.

As noted above, numerous methods, means, mechanisms, processes and procedures for converting a value from a second numbering system to a first, different, numbering system are well known to those of skill in the art. Consequently, a more detailed discussion of specific methods, means, mechanisms, processes and procedures for converting a value from a second numbering system to a first, different, numbering system at CONVERT THE STORED VALUE IN THE SECOND NUMBERING SYSTEM TO A RECALLED VALUE IN THE FIRST NUMBERING SYSTEM OPERATION 211 are omitted here to avoid detracting from the invention.

In one embodiment, once the stored value in the second numbering system of RECALL THE STORED VALUE OPERATION 209, is converted back to first numbering system to yield a recalled value in the first numbering system at CONVERT THE STORED VALUE IN THE SECOND NUMBERING SYSTEM TO A RECALLED VALUE IN THE FIRST NUMBERING SYSTEM OPERATION 211, process flow proceeds through PROCEED TO 213B OF FIG. 2B OPERATION 213A of FIG. 2A, to FIG. 2B, through FROM 213A OF FIG. 2A OPERATION 213B, to ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215.

In one embodiment, at ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215, the last significant digit of the recalled value in the first numbering system from CONVERT THE STORED VALUE IN THE SECOND NUMBERING SYSTEM TO A RECALLED VALUE IN THE FIRST NUMBERING SYSTEM OPERATION 211 is eliminated to produce an edited recalled value in the first numbering system. In one embodiment, the edited recalled value in the first numbering system is rounded off to the nearest value in the first numbering system of the remaining number of significant digits.

In one embodiment, the elimination of the last significant digit of the recalled value in the first numbering system at ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215 is performed by a central processing unit, such as CPU 101 or processor 121 of FIG. 1 under the direction of a computing system such as computing system 100 and/or a computing system implemented process. In some embodiments the elimination of the last significant digit is performed by and/or under the direction of a computing system and/or computing system implemented process implementing all or part of process for selecting a display value 200. In some embodiments the conversion is performed by and/or under the direction of a computing system and/or computing system implemented process separate from that implementing all or part of process for selecting a display value 200.

Numerous methods, means, mechanisms, processes and procedures for eliminating the last significant digit of a recalled value in the first numbering system are well known to those of skill in the art. Consequently, a more detailed discussion of specific methods, means, mechanisms, processes and procedures for eliminating the last significant digit of a recalled value in the first numbering system at ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215 are omitted here to avoid detracting from the invention.

In one embodiment, once the last significant digit of the recalled value in the first numbering system from CONVERT THE STORED VALUE IN THE SECOND NUMBERING SYSTEM TO A RECALLED VALUE IN THE FIRST NUMBERING SYSTEM OPERATION 211 is eliminated to create an edited recalled value in the first numbering system at ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215, process flow proceeds to SAVE THE EDITED RECALLED VALUE IN THE FIRST NUMBERING SYSTEM OPERATION 217.

In one embodiment, at SAVE THE EDITED RECALLED VALUE IN THE FIRST NUMBERING SYSTEM OPERATION 217, data representing the edited recalled value in the first numbering system is stored and/or saved by storing/saving the data, in whole, or in part, by any one of the numerous mechanisms known to those of skill in the art and/or as discussed herein, whether known at the time of filing or as developed thereafter.

In one embodiment, once data representing the edited recalled value in the first numbering system is stored at SAVE THE EDITED RECALLED VALUE IN THE FIRST NUMBERING SYSTEM OPERATION 217, process flow proceeds to CONVERT THE EDITED RECALLED VALUE IN THE FIRST NUMBERING SYSTEM TO AN EDITED RECALLED VALUE IN THE SECOND NUMBERING SYSTEM OPERATION 219.

In one embodiment, at CONVERT THE EDITED RECALLED VALUE IN THE FIRST NUMBERING SYSTEM TO AN EDITED RECALLED VALUE IN THE SECOND NUMBERING SYSTEM OPERATION 219, the edited recalled value in the first numbering system is converted to an edited recalled value in the second numbering system by any of the methods, mechanisms, means, processes and/or procedures discussed above, and typically using the scaling factor of CONVERT THE INITIAL VALUE IN THE FIRST NUMBERING SYSTEM TO A STORED VALUE IN A SECOND NUMBERING SYSTEM OPERATION 205 of FIG. 2A.

In one embodiment, once the edited recalled value in the first numbering system is converted to an edited recalled value in the second numbering system, process flow proceeds to COMPARE THE EDITED RECALLED VALUE IN THE SECOND NUMBERING SYSTEM WITH THE STORED VALUE OPERATION 221.

In one embodiment, at COMPARE THE EDITED RECALLED VALUE IN THE SECOND NUMBERING SYSTEM WITH THE STORED VALUE OPERATION 221, the edited recalled value in the second numbering system is compared to the stored value in the second numbering system of SAVE THE STORED VALUE IN THE SECOND NUMBERING SYSTEM OPERATION 207 (FIG. 2A).

Returning to FIG. 2B, in one embodiment, the comparison of the edited recalled value in the second numbering system with the stored value in the second numbering system is performed by a central processing unit, such as CPU 101 or processor 121 of FIG. 1 under the direction of a computing system such as computing system 100 and/or a computing system implemented process. In some embodiments the comparison is performed by and/or under the direction of a computing system and/or computing system implemented process implementing all or part of process for selecting a display value 200 of FIGS. 2A and 2B. In some embodiments the comparison is performed by and/or under the direction of a computing system and/or computing system implemented process separate from that implementing all or part of process for selecting a display value 200.

Numerous methods, means, mechanisms, processes and procedures for comparing one value with another value are well known to those of skill in the art. Consequently, a more detailed discussion of specific methods, means, mechanisms, processes and procedures for the comparison of the edited recalled value in the second numbering system with the stored value in the second numbering system at COMPARE THE EDITED RECALLED VALUE IN THE SECOND NUMBERING SYSTEM WITH THE STORED VALUE OPERATION 221 are omitted here to avoid detracting from the invention.

In one embodiment, once the edited recalled value in the second numbering system is compared to the stored value in the second numbering system at COMPARE THE EDITED RECALLED VALUE IN THE SECOND NUMBERING SYSTEM WITH THE STORED VALUE OPERATION 221, process flow proceeds to IS THE EDITED RECALLED VALUE IN THE SECOND NUMBERING SYSTEM EQUAL TO THE STORED VALUE? OPERATION 223.

In one embodiment, at IS THE EDITED RECALLED VALUE IN THE SECOND NUMBERING SYSTEM EQUAL TO THE STORED VALUE? OPERATION 223 a determination is made as to whether or not the edited recalled value in the second numbering system is equal to the stored value in the second numbering system.

In one embodiment, if it is determined at IS THE EDITED RECALLED VALUE IN THE SECOND NUMBERING SYSTEM EQUAL TO THE STORED VALUE? OPERATION 223 that the edited recalled value in the second numbering system is equal to the stored value in the second numbering system, i.e., a yes result is entered, it follows that the elimination of the last significant digit at ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215 yields an edited recalled value in the first numbering system that converts to an identical stored value in the second numbering system. In short, the elimination of the last significant digit has no effect other than simplifying the value eventually displayed or further processed. Consequently, it is appropriate to use the edited recalled value in the first numbering system of ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215 and SAVE THE EDITED RECALLED VALUE IN THE FIRST NUMBERING SYSTEM OPERATION 217 as the display value.

In addition, in one embodiment, if it is determined at IS THE EDITED RECALLED VALUE IN THE SECOND NUMBERING SYSTEM EQUAL TO THE STORED VALUE? OPERATION 223 that the edited recalled value in the second numbering system is equal to the stored value in the second numbering system, i.e., a yes result is obtained, process flow proceeds back to ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215 where another significant digit is eliminated.

In this instance, at ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215, the next to last significant digit of the recalled value in the first numbering system from CONVERT THE STORED VALUE IN THE SECOND NUMBERING SYSTEM TO A RECALLED VALUE IN THE FIRST NUMBERING SYSTEM OPERATION 211, i.e., the last significant digit of the edited recalled value of SAVE THE EDITED RECALLED VALUE IN THE FIRST NUMBERING SYSTEM OPERATION 217, is eliminated to produce a new edited recalled value in the first numbering system. In one embodiment, the new edited recalled value in the first numbering system is rounded to the nearest value in the first numbering system of the remaining number of significant digits.

In one embodiment, once the elimination of the last significant digit of the edited recalled value of SAVE THE EDITED RECALLED VALUE IN THE FIRST NUMBERING SYSTEM OPERATION 217 is performed at ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215, process flow again proceeds to SAVE THE EDITED RECALLED VALUE IN THE FIRST NUMBERING SYSTEM OPERATION 217.

In one embodiment, at SAVE THE EDITED RECALLED VALUE IN THE FIRST NUMBERING SYSTEM OPERATION 217, data representing the new edited recalled value in the first numbering system is stored and/or saved by storing/saving the data, in whole, or in part, by any one of the numerous mechanisms known to those of skill in the art and/or as discussed herein.

In one embodiment, once data representing the new edited recalled value in the first numbering system is stored at SAVE THE EDITED RECALLED VALUE IN THE FIRST NUMBERING SYSTEM OPERATION 217, process flow proceeds again to CONVERT THE EDITED RECALLED VALUE IN THE FIRST NUMBERING SYSTEM TO AN EDITED RECALLED VALUE IN THE SECOND NUMBERING SYSTEM OPERATION 219.

In one embodiment, at CONVERT THE EDITED RECALLED VALUE IN THE FIRST NUMBERING SYSTEM TO AN EDITED RECALLED VALUE IN THE SECOND NUMBERING SYSTEM OPERATION 219, the new edited recalled value in the first numbering system is converted to a new edited recalled value in the second numbering system by any of the methods, mechanisms, means, processes and/or procedures discussed above.

In one embodiment, once the new edited recalled value in the first numbering system is converted to a new edited recalled value in the second numbering system, process flow proceeds to COMPARE THE EDITED RECALLED VALUE IN THE SECOND NUMBERING SYSTEM WITH THE STORED VALUE OPERATION 221.

In one embodiment, at COMPARE THE EDITED RECALLED VALUE IN THE SECOND NUMBERING SYSTEM WITH THE STORED VALUE OPERATION 221, the new edited recalled value in the second numbering system is compared to the stored value in the second numbering system of SAVE THE STORED VALUE IN THE SECOND NUMBERING SYSTEM OPERATION 207 (FIG. 2A).

Returning to FIG. 2B, once the new edited recalled value in the second numbering system is compared to the stored value in the second numbering system at COMPARE THE EDITED RECALLED VALUE IN THE SECOND NUMBERING SYSTEM WITH THE STORED VALUE OPERATION 221, process flow again proceeds to IS THE EDITED RECALLED VALUE IN THE SECOND NUMBERING SYSTEM EQUAL TO THE STORED VALUE? OPERATION 223.

In one embodiment, the process discussed above is repeated, with successive significant digits being eliminated from the recalled value of CONVERT THE STORED VALUE IN THE SECOND NUMBERING SYSTEM TO A RECALLED VALUE IN THE FIRST NUMBERING SYSTEM OPERATION 211, until it is determined at IS THE EDITED RECALLED VALUE IN THE SECOND NUMBERING SYSTEM EQUAL TO THE STORED VALUE? OPERATION 223 that the edited recalled value in the second numbering system is not equal to the stored value in the second numbering system, i.e., a no result is obtained. Once it is determined that the edited recalled value in the second numbering system is not equal to the stored value in the second numbering system, it follows that the immediately preceding elimination of the last significant digit at ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215 yields an edited recalled value in the first numbering system that does not convert to an identical stored value in the second numbering system. Consequently, the immediately proceeding elimination of the last significant digit is deemed one iteration too far and it is inappropriate to use the current edited recalled value in the first numbering system of ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215 and SAVE THE EDITED RECALLED VALUE IN THE FIRST NUMBERING SYSTEM OPERATION 217 as the display value.

As a result, once it is determined at IS THE EDITED RECALLED VALUE IN THE SECOND NUMBERING SYSTEM EQUAL TO THE STORED VALUE? OPERATION 223 that the edited recalled value in the second numbering system is not equal to the stored value in the second numbering system, i.e., a no result is obtained, process flow proceeds to ACCESS THE LAST EDITED RECALLED VALUE THAT WAS EQUAL TO STORED VALUE IN THE SECOND NUMBERING SYSTEM AND DESIGNATE IT AS THE SELECTED DISPLAY VALUE OPERATION 225.

In one embodiment, at ACCESS THE LAST EDITED RECALLED VALUE THAT WAS EQUAL TO STORED VALUE IN THE SECOND NUMBERING SYSTEM AND DESIGNATE IT AS THE SELECTED DISPLAY VALUE OPERATION 225 the last edited recalled value in the first numbering system stored at SAVE THE EDITED RECALLED VALUE IN THE FIRST NUMBERING SYSTEM OPERATION 217 corresponding to the edited recalled value in the second numbering system that was equal to the stored value in the second numbering system is accessed, recalled and designated the selected display value.

In one embodiment, the selected display value is accessed and recalled for display and/or further processing from a storage device, such as a memory and/or database and/or program product including the storage devices discussed above with respect to SAVE THE STORED VALUE IN THE SECOND NUMBERING SYSTEM OPERATION 207.

In one embodiment, once the last edited recalled value in the first numbering system stored at SAVE THE EDITED RECALLED VALUE IN THE FIRST NUMBERING SYS- TEM OPERATION 217 corresponding to the edited recalled value in the second numbering system that was equal to the stored value in the second numbering system is accessed, recalled and designated the selected display value at ACCESS THE LAST EDITED RECALLED VALUE THAT WAS EQUAL TO STORED VALUE IN THE SECOND NUMBERING SYSTEM AND DESIGNATE IT AS THE SELECTED DISPLAY VALUE OPERATION 225, process flow proceeds to USE THE SELECTED DISPLAY VALUE FOR DISPLAY AND/OR FURTHER PROCESSING OPERATION 227.

In one embodiment, at USE THE SELECTED DISPLAY VALUE FOR DISPLAY AND/OR FURTHER PROCESSING OPERATION 227, the selected display value of ACCESS THE LAST EDITED RECALLED VALUE THAT WAS EQUAL TO STORED VALUE IN THE SECOND NUMBERING SYSTEM AND DESIGNATE IT AS THE SELECTED DISPLAY VALUE OPERATION 225 is displayed and/or used for further processing.

In one embodiment, at USE THE SELECTED DISPLAY VALUE FOR DISPLAY AND/OR FURTHER PROCESSING OPERATION 227, the selected display value is displayed by a computing system and/or computing system implemented process on a display device, such as display devices 115 and 125 of a computing system and/or device, such as computing system 100 and/or server system 120 of FIG. 1 by any one of methods, mechanisms, process and/or procedures well known to those of skill in the art or as developed after the time of filing.

As discussed above, the computing system and/or device, such as computing system 100 and/or server system 120 of FIG. 1, implementing process for selecting a display value 200 and/or providing for the display and/or processing of the selected display value at USE THE SELECTED DISPLAY VALUE FOR DISPLAY AND/OR FURTHER PROCESSING OPERATION 227 is a portable computer, a workstation, a two-way pager, a cellular telephone, a smart phone, a digital wireless telephone, a personal digital assistant, a server computer, an Internet appliance, or any other device that includes components that can provide a process for selecting a display value user interface and/or a process for selecting a display value in accordance with at least one of the embodiments as described herein. Similarly, in another embodiment, a process for selecting a display value is implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

In one embodiment, once the selected display value of ACCESS THE LAST EDITED RECALLED VALUE THAT WAS EQUAL TO STORED VALUE IN THE SECOND NUMBERING SYSTEM AND DESIGNATE IT AS THE SELECTED DISPLAY VALUE OPERATION 225 is displayed and/or used for further processing at USE THE SELECTED DISPLAY VALUE FOR DISPLAY AND/OR FURTHER PROCESSING OPERATION 227, process flow proceeds to EXIT OPERATION 229 and process for selecting a display value 200 returns to ENTER INITIAL VALUE IN FIRST NUMBERING SYSTEM OPERATION 203 to await the next initial value to be entered.

As a specific example of the application of process for selecting a display value 200, we return to the example discussed above where an initial value of 0.25 inches is entered into a computing system defaulting to units of feet.

Recall that using current systems, when the user enters and/or edits an initial value of 0.25 inches, into a computing system running a computing system implemented process, such as a computing system implemented point of sale application, the initial value of 0.25 inches is converted to a stored value of 0.02083 feet. Further recall, that when the user calls up the value to be displayed again as a display value in the unit of inches, the stored value 0.02083 converts to a display value of 0.24997 inches which is not a particularly useful or aesthetically pleasing representation and, in many cases, fails to accurately reflect physical realities/capabilities.

In contrast, applying process for selecting a recalled value 200, the initial value of 0.25 inches, in the first numbering system of inches, is entered at ENTER INITIAL VALUE IN FIRST NUMBERING SYSTEM OPERATION 203 by the methods and/or means discussed above. Then at CONVERT THE INITIAL VALUE IN THE FIRST NUMBERING SYSTEM TO A STORED VALUE IN A SECOND NUMBERING SYSTEM OPERATION 205, the initial value of 0.25 inches is converted to a stored value of 0.02083 feet, in the second numbering system of feet, using a scaling factor of (1 foot/12 inches) by the methods and/or means discussed above. The stored value of 0.02083 feet is then saved at SAVE THE STORED VALUE IN THE SECOND NUMBERING SYSTEM OPERATION 207 by the methods and/or means discussed above.

Continuing with the specific example of the application of process for selecting a recalled value 200, at RECALL THE STORED VALUE OPERATION 209, the stored value of 0.02083 feet is recalled and converted back into the first numbering system of inches at CONVERT THE STORED VALUE IN THE SECOND NUMBERING SYSTEM TO A RECALLED VALUE IN THE FIRST NUMBERING SYSTEM OPERATION 211 to yield the recalled value in the first numbering system of 0.24997 inches.

In this specific example, at ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215, the recalled value in the first numbering system of 0.24997 inches becomes the rounded edited recalled value of 0.25 inches. The edited recalled value of 0.25 inches is then stored at SAVE THE EDITED RECALLED VALUE IN THE FIRST NUMBERING SYSTEM OPERATION 217. Then at CONVERT THE EDITED RECALLED VALUE IN THE FIRST NUMBERING SYSTEM TO AN EDITED RECALLED VALUE IN THE SECOND NUMBERING SYSTEM OPERATION 219, the edited recalled value in the first numbering system of 0.25 inches is converted to the second numbering system of feet and an edited recalled value of 0.02083 feet in the second numbering system is obtained by the methods and/or means discussed above.

Continuing with the specific example of the application of process for selecting a recalled value 200, at COMPARE THE EDITED RECALLED VALUE IN THE SECOND NUMBERING SYSTEM WITH THE STORED VALUE OPERATION 221, the stored value of 0.02083 feet in the second numbering system of feet is compared with the edited recalled value of 0.02083 feet in the second numbering system. Since, in this specific example, the initial value from ENTER INITIAL VALUE IN FIRST NUMBERING SYSTEM OPERATION 203 of 0.25 inches is identical to the edited recalled value in the first numbering system of 0.25 inches from SAVE THE EDITED RECALLED VALUE IN THE FIRST NUMBERING SYSTEM OPERATION 217, it is not surprising that at COMPARE THE EDITED RECALLED VALUE IN THE SECOND NUMBERING SYSTEM WITH THE STORED VALUE OPERATION 221, the stored value of 0.02083 feet in the second numbering system of feet is found equal to the edited recalled value of 0.02083 feet in the second numbering system. However, in one embodiment, process for selecting a recalled value 200 then returns to ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215 and a next significant digit is eliminated.

In this specific example, at ELIMINATE A SIGNIFICANT DIGIT OF THE RECALLED VALUE AND ROUND OFF THE RECALLED VALUE IN THE FIRST NUMBERING SYSTEM TO CREATE AN EDITED RECALLED VALUE OPERATION 215, the edited recalled value in the first numbering system of 0.25 inches from SAVE THE EDITED RECALLED VALUE IN THE FIRST NUMBERING SYSTEM OPERATION 217 becomes the rounded new edited recalled value in the first numbering system of 0.3 inches. The new edited recalled value of 0.3 inches is then stored at SAVE THE EDITED RECALLED VALUE IN THE FIRST NUMBERING SYSTEM OPERATION 217. Then at CONVERT THE EDITED RECALLED VALUE IN THE FIRST NUMBERING SYSTEM TO AN EDITED RECALLED VALUE IN THE SECOND NUMBERING SYSTEM OPERATION 219, the new edited recalled value in the first numbering system of 0.3 inches is converted to the second numbering system of feet and a new edited recalled value of 0.02500 feet in the second numbering system is obtained by the methods and/or means discussed above.

Continuing with the specific example of the application of process for selecting a recalled value 200, at COMPARE THE EDITED RECALLED VALUE IN THE SECOND NUMBERING SYSTEM WITH THE STORED VALUE OPERATION 221, the stored value of 0.02083 feet in the second numbering system of feet is compared with the new edited recalled value of 0.02500 feet in the second numbering system. In this specific example, at COMPARE THE EDITED RECALLED VALUE IN THE SECOND NUMBERING SYSTEM WITH THE STORED VALUE OPERATION 221, the stored value of 0.02083 feet in the second numbering system of feet is found not equal to the edited recalled value of 0.02500 feet in the second numbering system. Consequently, the new edited recalled value in the first numbering system of 0.3000 inches is deemed inappropriate for use as the display value.

As a result, the last edited recalled value in the first numbering system corresponding the edited recalled value of 0.02083 feet in the second numbering system, in this example, edited recalled value in the first numbering system of 0.25 inches is recalled at RECALL THE LAST EDITED RECALLED VALUE THAT WAS EQUAL TO STORED VALUE IN THE SECOND NUMBERING SYSTEM OPERATION 225 OPERATION 225 and selected for use at USE THE SELECTED DISPLAY VALUE FOR DISPLAY AND/OR FURTHER PROCESSING OPERATION 227.

Using the method and system to compensate for inaccuracy associated with processing values with finite precision, and a process for selecting a display value 200, the display value in the first numbering system selected is the value in the first numbering system that has the least number of significant digits that still converts to the same stored value in the second numbering system. Consequently, using the method and system to compensate for inaccuracy associated with processing values with finite precision, and a process for selecting a display value 200, rounding error associated with round-tripping in computing systems using finite arithmetic is minimized because the stored value remains unchanged, while the resulting display value is made as useful, practical, aesthetically pleasing, as possible.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein is merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "entering", "converting", "saving", "recalling", "converting", "eliminating", "storing", "comparing", "accessing", "creating", "displaying", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for selecting a display value comprising:
    entering an initial value into a computing system using a user interface, the initial value being entered in a first numbering system;
    converting the initial value from the first numbering system into a second numbering system, thereby creating a stored value;
    saving the stored value;
    accessing the stored value;
    converting the stored value from the second numbering system to the first numbering system, thereby creating a recalled value;
    eliminating a least significant digit from the recalled value, thereby creating an edited recalled value
    saving the edited recalled value in the first numbering system;
    converting the edited recalled value in the first numbering system from the first numbering system to the second numbering system, thereby creating an edited recalled value in the second numbering system; and
    comparing the edited recalled value in the second numbering system with the stored value, wherein;
    if the edited recalled value in the second numbering system is not equal to the stored value, selecting the recalled value in the first numbering system as a display value; and
    if the edited recalled value in the second numbering system is equal to the stored value, repeating:
    eliminating another least significant digit from the recalled value, thereby creating a new edited recalled value in the first numbering system;
    saving the new edited recalled value in the first numbering system;
    converting the new edited recalled value in the first numbering system from the first numbering system to the second numbering system, thereby creating an new edited recalled value in the second numbering system; and
    comparing the new edited recalled value in the second numbering system with the stored value,
    n times, where n is a whole number greater than one, such that at the nth occurrence of comparing the new edited recalled value in the second numbering system with the stored value, the nth new edited recalled value in the second numbering system does not equal the stored value; and
    selecting the n-1 new edited recalled value in the first numbering system as the display value.

2. The computing system implemented process for selecting a display value of claim 1, wherein;
    the first numbering system is a first system of units; and
    the second numbering system is a second system of units, the second system of units being different from the first system of units.

3. The computing system implemented process for selecting a display value of claim 1, wherein;
    the first numbering system is a first system of length units; and
    the second numbering system is a second system of length units, the second system of length units being different from the first system of length units.

4. The computing system implemented process for selecting a display value of claim 1, wherein;
    the first numbering system is a first system of area units; and
    the second numbering system is a second system of area units, the second system of area units being different from the first system of area units.

5. The computing system implemented process for selecting a display value of claim 1, wherein;
    the first numbering system is a first system of volume units; and
    the second numbering system is a second system of volume units, the second system of volume units being different from the first system of volume units.

6. The computing system implemented process for selecting a display value of claim 1, wherein;
    the first numbering system is a first system of weight units; and
    the second numbering system is a second system of weight units, the second system of weight units being different from the first system of weight units.

7. The computing system implemented process for selecting a display value of claim 1, wherein;
    the first numbering system is a first system of sales units; and
    the second numbering system is a second system of sales units, the second system of sales units being different from the first system of sales units.

8. The computing system implemented process for selecting a display value of claim 1, wherein;
    the first numbering system is a first system of monetary units; and the second numbering system is a second system of monetary units, the second system of monetary units being different from the first system of monetary units.

9. The computing system implemented process for selecting a display value of claim 1, wherein;
the first numbering system is a first base value numbering system; and
the second numbering system is a second base value numbering system, the second base value being different from the first base value.

10. A system for selecting a display value comprising:
a computing system;
a display device;
a user interface; and
a processor for executing at least part of a process for selecting a display value, the process for selecting a display value comprising:
entering an initial value into a computing system using the user interface, the initial value being entered in a first numbering system;
converting the initial value from the first numbering system into a second numbering system, thereby creating a stored value;
saving the stored value;
accessing the stored value;
converting the stored value from the second numbering system to the first numbering system, thereby creating a recalled value;
eliminating a least significant digit from the recalled value, thereby creating an edited recalled value in the first numbering system;
saving the edited recalled value in the first numbering system;
converting the edited recalled value in the first numbering system from the first numbering system to the second numbering system, thereby creating an edited recalled value in the second numbering system; and
comparing the edited recalled value in the second numbering system with the stored value, wherein;
if the edited recalled value in the second numbering system is not equal to the stored value, selecting the recalled value in the first numbering system as a display value; and
if the edited recalled value in the second numbering system is equal to the stored value, repeating:
eliminating another least significant digit from the recalled value, thereby creating a new edited recalled value in the first numbering system;
saving the new edited recalled value in the first numbering system;
converting the new edited recalled value in the first numbering system from the first numbering system to the second numbering system, thereby creating an new edited recalled value in the second numbering system; and
comparing the new edited recalled value in the second numbering system with the stored value,
n times, where n is a whole number greater than one, such that at the nth occurrence of comparing the new edited recalled value in the second numbering system with the stored value, the nth new edited recalled value in the second numbering system does not equal the stored value;
selecting the n-1 new edited recalled value in the first numbering system as the display value; and
displaying the n-1 new edited recalled value in the first numbering system on the display device.

11. The system for selecting a display value of claim 10, wherein;
the first numbering system is a first system of units; and
the second numbering system is a second system of units, the second system of units being different from the first system of units.

12. A computer program product for providing a process for selecting a display value comprising:
a non-transitory computer readable medium;
and computer program code, encoded on the computer readable medium, comprising computer readable instructions for:
providing for entry of an initial value into a computing system using a user interface, the initial value being entered in a first numbering system;
converting the initial value from the first numbering system into a second numbering system, thereby creating a stored value;
saving the stored value;
accessing the stored value;
converting the stored value from the second numbering system to the first numbering system, thereby creating a recalled value;
eliminating a least significant digit from the recalled value, thereby creating an edited recalled value in the first numbering system;
saving the edited recalled value in the first numbering system;
converting the edited recalled value in the first numbering system from the first numbering system to the second numbering system, thereby creating an edited recalled value in the second numbering system; and
comparing the edited recalled value in the second numbering system with the stored value, wherein;
if the edited recalled value in the second numbering system is not equal to the stored value, selecting the recalled value in the first numbering system as a display value; and
if the edited recalled value in the second numbering system is equal to the stored value, repeating:
eliminating another least significant digit from the recalled value, thereby creating a new edited recalled value in the first numbering system;
saving the new edited recalled value in the first numbering system;
converting the new edited recalled value in the first numbering system from the first numbering system to the second numbering system, thereby creating an new edited recalled value in the second numbering system; and
comparing the new edited recalled value in the second numbering system with the stored value,
n times, where n is a whole number greater than one, such that at the nth occurrence of comparing the new edited recalled value in the second numbering system with the stored value, the nth new edited recalled value in the second numbering system does not equal the stored value; and
selecting the n-1 new edited recalled value in the first numbering system as the display value.

13. The computer program product for providing a process for selecting a display value of claim 12, wherein;
the first numbering system is a first system of units; and
the second numbering system is a second system of units, the second system of units being different from the first system of units.

14. The computer program product for providing a process for selecting a display value of claim 12, wherein;
- the first numbering system is a first system of length units; and
- the second numbering system is a second system of length units, the second system of length units being different from the first system of length units.

15. The computer program product for providing a process for selecting a display value of claim 12, wherein;
- the first numbering system is a first system of area units; and
- the second numbering system is a second system of area units, the second system of area units being different from the first system of area units.

16. The computer program product for providing a process for selecting a display value of claim 12, wherein;
- the first numbering system is a first system of volume units; and
- the second numbering system is a second system of volume units, the second system of volume units being different from the first system of volume units.

17. The computer program product for providing a process for selecting a display value of claim 12, wherein;
- the first numbering system is a first system of weight units; and
- the second numbering system is a second system of weight units, the second system of weight units being different from the first system of weight units.

18. The computer program product for providing a process for selecting a display value of claim 12, wherein;
- the first numbering system is a first system of sales units; and
- the second numbering system is a second system of sales units, the second system of sales units being different from the first system of sales units.

19. The computer program product for providing a process for selecting a display value of claim 12, wherein;
- the first numbering system is a first system of monetary units; and
- the second numbering system is a second system of monetary units, the second system of monetary units being different from the first system of monetary units.

20. The computer program product for providing a process for selecting a display value of claim 12, wherein;
- the first numbering system is a first base value numbering system; and
- the second numbering system is a second base value numbering system, the second base value being different from the first base value.

21. The computing system implemented process for selecting a display value of claim 10, wherein;
- the first numbering system is a first system of length units; and
- the second numbering system is a second system of length units, the second system of length units being different from the first system of length units.

22. The computing system implemented process for selecting a display value of claim 10, wherein;
- the first numbering system is a first system of area units; and
- the second numbering system is a second system of area units, the second system of area units being different from the first system of area units.

23. The computing system implemented process for selecting a display value of claim 10, wherein;
- the first numbering system is a first system of volume units; and
- the second numbering system is a second system of volume units, the second system of volume units being different from the first system of volume units.

24. The computing system implemented process for selecting a display value of claim 10, wherein;
- the first numbering system is a first system of weight units; and
- the second numbering system is a second system of weight units, the second system of weight units being different from the first system of weight units.

25. The computing system implemented process for selecting a display value of claim 10, wherein;
- the first numbering system is a first system of sales units; and
- the second numbering system is a second system of sales units, the second system of sales units being different from the first system of sales units.

26. The computing system implemented process for selecting a display value of claim 10, wherein;
- the first numbering system is a first system of monetary units; and
- the second numbering system is a second system of monetary units, the second system of monetary units being different from the first system of monetary units.

27. The computing system implemented process for selecting a display value of claim 10, wherein;
- the first numbering system is a first base value numbering system; and
- the second numbering system is a second base value numbering system, the second base value being different from the first base value.

* * * * *

UNITED STATES PATENT AND TRADEMARK OFFICE
CERTIFICATE OF CORRECTION

| | | |
|---|---|---|
| PATENT NO. | : 8,037,115 B1 | Page 1 of 1 |
| APPLICATION NO. | : 11/624153 | |
| DATED | : October 11, 2011 | |
| INVENTOR(S) | : Michael Amore Scalora et al. | |

It is certified that error appears in the above-identified patent and that said Letters Patent is hereby corrected as shown below:

In the Claims

In Column 21, Line 55, Claim 1, after "recalled value", insert --in the first numbering system;--;
In Column 23, Line 53, Claim 10, replace "creating an new" with --creating a new--; and
In Column 24, Line 48, Claim 12, replace "creating an new" with --creating a new--.

Signed and Sealed this
Twenty-ninth Day of October, 2013

Teresa Stanek Rea
*Deputy Director of the United States Patent and Trademark Office*